United States Patent [19]
Putnam, Jr. et al.

[11] 3,986,921
[45] Oct. 19, 1976

[54] SEALING JAW MECHANISM FOR PACKAGE MAKING MACHINE

[75] Inventors: Roger L. Putnam, Jr., East Longmeadow; Edward F. O'Brien, Northampton, both of Mass.

[73] Assignee: Package Machinery Company, East Longmeadow, Mass.

[22] Filed: Dec. 10, 1975

[21] Appl. No.: 639,394

[52] U.S. Cl. ............................ 156/583; 53/182 M; 100/264
[51] Int. Cl.² .................. B30B 15/34; B32B 31/20; B65B 51/14
[58] Field of Search ......... 53/180 R, 180 M, 182 R, 53/182 M; 100/264; 156/515, 580, 583

[56] References Cited
UNITED STATES PATENTS

| | | |
|---|---|---|
| 3,083,513 | 4/1963 | Cochrane .......................... 53/182 R |
| 3,172,245 | 3/1965 | Aquarius et al .................. 53/182 M |

*Primary Examiner*—Robert L. Spruill
*Attorney, Agent, or Firm*—McCormick, Paulding & Huber

[57] ABSTRACT

A mechanism for forming seals at spaced points along the length of a body of web material moved through the mechanism is comprised of two sealing jaws and a simple device for opening and closing the jaws whereby the mechanism consists of a small number of parts and may be made at a relatively low cost and to have a relatively light weight. The jaws are slidably supported relative to a base for pure linear motion and are moved between their open and closed conditions by an air cylinder or other fluid actuator which is unfixed to and floats relative to the base.

8 Claims, 6 Drawing Figures

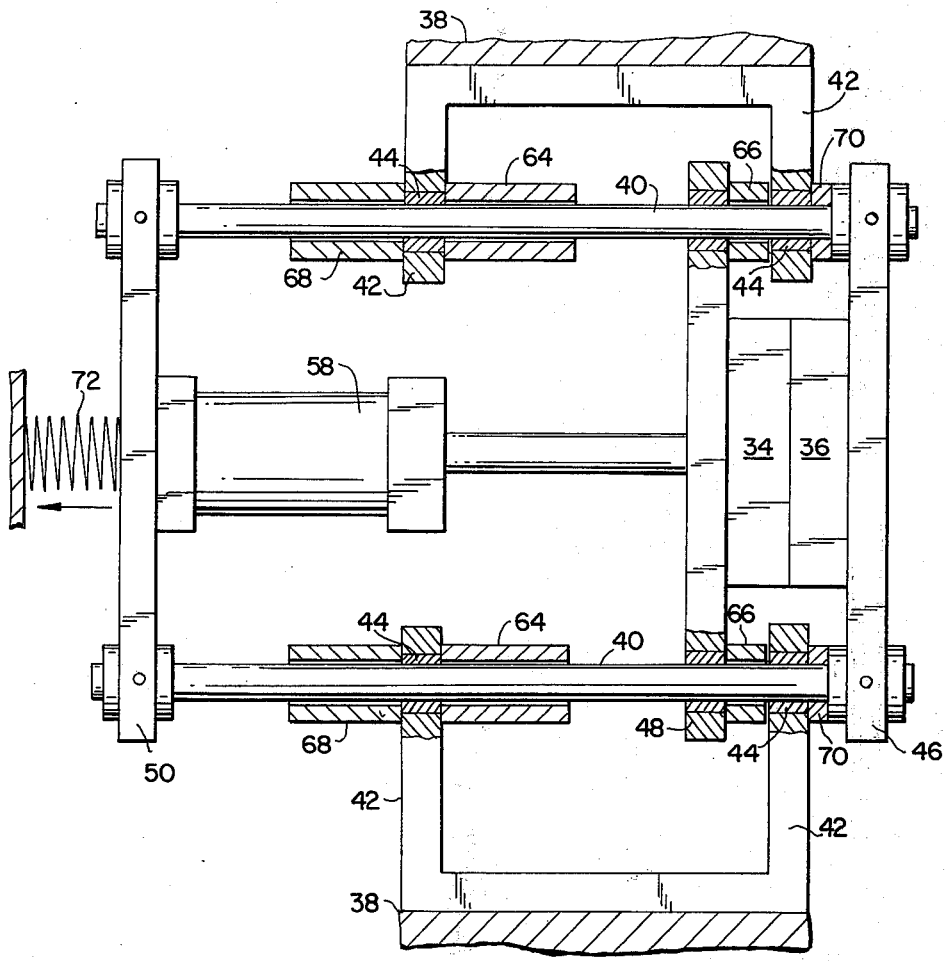

SEALING JAW MECHANISM FOR PACKAGE MAKING MACHINE

BACKGROUND OF THE INVENTION

This invention pertains to machines for making packages from web material, and deals more particularly with a sealing mechanism for use in such a machine for sealing at least two layers of a body of web material to one another as the web material is moved through the machine.

In package making machines, it is quite common to form seals in web material by two sealing jaws which in a seal making cycle from an open position move to a closed position at which the web material is squeezed therebetween. During the closed state of the jaws, the seal may be formed in various different ways as by applying heat from one or the other or both of the jaws to a heat sealable web material, by applying the pressure of the jaws to a pressure sensitive web material, or by applying clips, staples, bands, adhesive strips or other fasteners to the material. The present invention concerns primarily an apparatus or mechanism for operating such sealing jaws and may be used in various different types of package making machines and for making various different forms of seals. By way of example, the mechanism is shown herein as part of a vertical forming, filling and sealing packaging machine for making package end seals, but it will be understood that the invention in its broader aspects is not limited to this particular application.

The general object of this invention is to provide a sealing mechanism for a web fed package making machine including two sealing jaws cyclicly moved between opened and closed positions which is of a simple, low cost construction requiring few parts and which is adaptable to being made to have a relatively light weight.

In keeping with the foregoing object, another object of the invention is to provide a jaw type sealing mechanism for a package making machine which eliminates the need for toggle mechanisms, levers, cranks and the like commonly used with prior art mechanisms and wherein the opening and closing action of the jaws in a pure linear motion.

Another object of the invention is to provide a sealing mechanism of the foregoing character wherein both of the sealing jaws are movable relative to the base of the associated machine and when closed meet at the center line of the path of movement of the web material through the mechanism so that the web material upon closing of the jaws is not deflected to one side or the other of its normal path.

A still further object of the invention is to provide a sealing mechanism of the foregoing character which may be arranged either as a stationary unit with the web material being fed by other means therethrough or which may be designed as a reciprocating unit for additional use in pulling or aiding in pulling the web material through the machine.

Other objects and advantages of the invention will be apparent from the following description and from the drawings and claims forming a part hereof.

BRIEF DESCRIPTION OF THE DRAWINGS

FIG. 6 is a view similar to FIG. 4 but showing the jaws in their fully closed condition.

SUMMARY OF THE INVENTION

The invention resides in a sealing mechanism for a machine for making packages from web material wherein two jaws are repetitively moved between relatively opened and closed conditions to form seals in two or more layers of a body of sheet material moved through the sealing mechanism. The two jaws are supported for sliding movement independently of one another relative to the base of the machine along a given axis generally perpendicular to the path of movement of the web material. Two stop means limit the movement of the first jaw in both directions along the given axis and two other stop means limit movement of the second jaw in both directions along the given axis. The opening and closing movement of the jaws is effected, in cooperation with the stop means, by an air cylinder or other fluid actuator which works on the two jaws without having either of its two ends fixed to the machine base.

In a more specific one of its aspects, the invention resides in the two stop means which are effective during closing movement of the jaws being arranged so that when the jaws are urged toward their closed conditions by the actuator they engage one another before being prevented from doing so by the stop means, thereby allowing the force of the actuator to be transferred across the jaws and to the web material clamped therebetween. Still more particularly, the invention resides in the means for slidably supporting and moving the jaws consisting of two rods, three cross pieces, two spaced bearing mounts for each rod and a fluid cylinder arranged as hereinafter described.

DESCRIPTION OF THE PREFERRED EMBODIMENT

Figure 1:
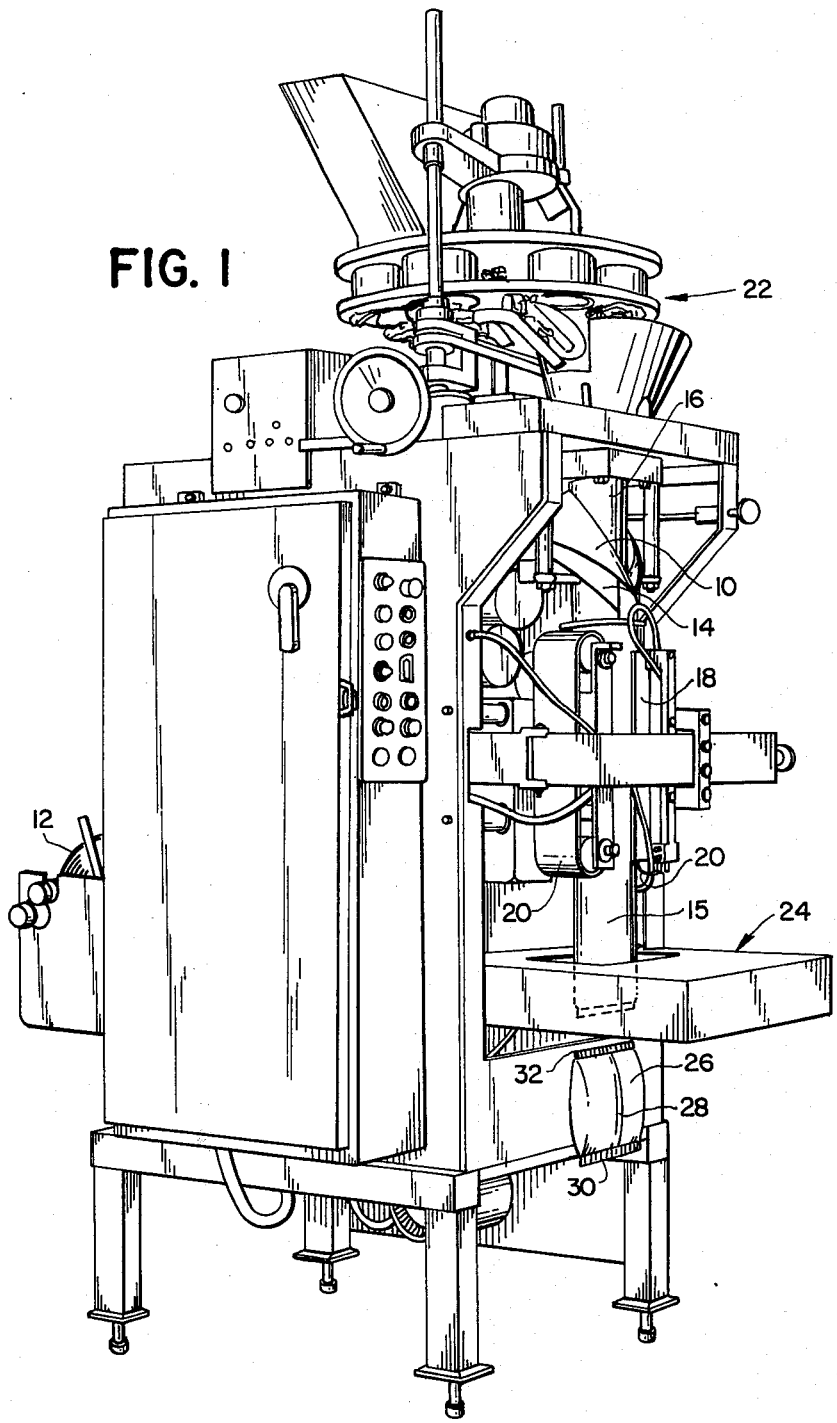
FIG. 1 is a perspective view of a vertical form, fill and seal packaging machine using a stationary end sealing mechanism embodying this invention.

Turning to FIG. 1, a package making machine having a sealing mechanism embodying this invention is there shown and is of the type referred to as a vertical form, fill and seal machine. A heat sealable web material 10 is supplied from a roll 12 and is guided to a former 14 at the top end of the machine which folds the flat web material into a vertically oriented tube 15 surrounding a tubular filling mandrel or pipe 16. The edges of the folded web material overlap one another, and as the folded tube moves downwardly over the mandrel 16 the overlapped marginal edge portions are heat sealed to one another by a cyclicly operated longitudinal seal sealing mechanism 18. The web material is advanced through the machine by a pair of intermittenly operated vacuum feed belts 20, 20 located on opposite sides of the web tube 15.

As packages are formed by the machine of FIG. 1, product is also filled into them by a feeder mechanism 22. The mechanism 22 is located on top of the machine, is driven in synchronism with the remainder of the machine, and cyclicly discharges measured Quantities of the product into the upper end of the filling mandrel 16.

The sealing mechanism of the FIG. 1 machine is indicated generally at 24 and forms package end seals in the web tube 15 by cyclicly flattening the tube and heat sealing the two layers of the flattened tube to one another through the use of two relatively moving jaws. A filled and finished package issuing from the machine is indicated at 26. The longitudinal seal formed by the longitudinal sealing mechanism 18 is indicated at 28 and its top and bottom end seals are shown at 30 and 32, respectively. During one closing movement of its jaws, the sealing mechanism 24 simultaneously forms the top end seal of the leading package and the bottom end seal of the following package and cuts the web material between the two seals to separate the leading package from the web tube. Vertical movement of the web tube 15 is stopped, by stopping the feed belts 20, 20 while the jaws are closed. Between successive operations of the jaws, the web tube is advanced by the feed belts and a charge of product is loaded into the web tube by the product feeder mechanism 22.

In the machine of FIG. 1, the end sealing mechanism 24 is fixed vertically relative to the frame of the machine and the folded and longitudinally sealed web tube 15 is fed downwardly through it by the vacuum feed belts 20, 20. In some other prior art designs of vertical form, fill and seal machines, however, the end sealing mechanism is reciprocated vertically and used to pull or to aid in pulling the web material through the machine. The use of a stationary end sealing mechanism in combination with a separate web feed device has certain advantages such as allowing the making of long length bags and enabling the vertical heighth of the overall machine to be minimized. However, it should be understood that the sealing mechanism 24 is not limited to stationary operation and, if desired, may be used in other machines wherein it is made to reciprocate vertically to pull or to aid in pulling the web material through the machine.

Figures 2, 3:
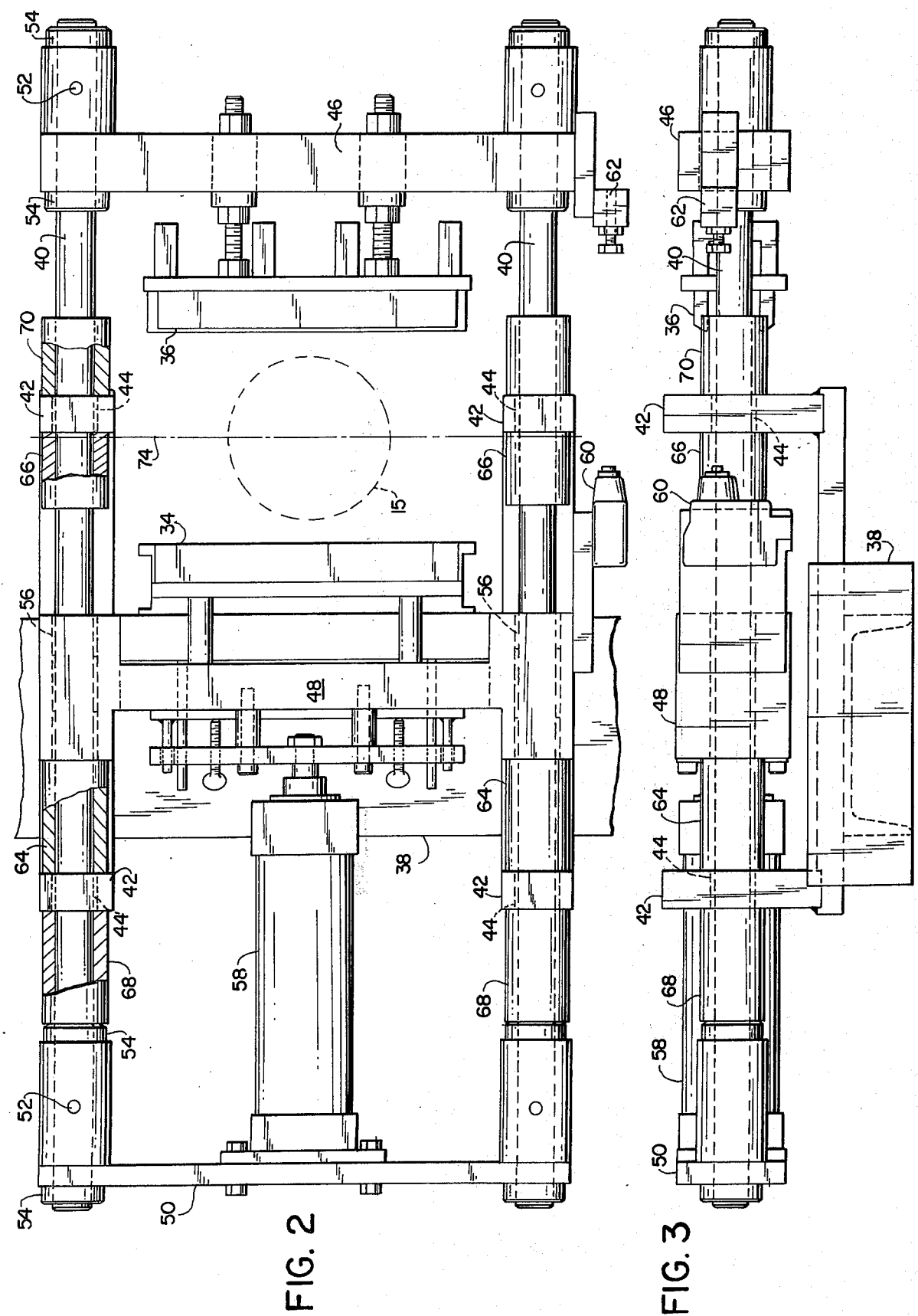
FIG. 2 is a plan view of the end sealing mechanism of the machine of FIG. 1.
FIG. 3 is a side elevational view of the sealing mechanism of FIG. 2 taken looking toward the right-hand side of FIG. 2.

FIGS. 2 and 3 show the actual construction of the sealing mechanism 24 of FIG. 1, and FIGS. 4, 5 and 6 show the same mechanism in a simplified, schematic and more easily understood form. Referring to these figures, the illustrated mechanism consists of two sealing jaws 34 and 36. The particular construction of the jaws may vary widely and is not important to the invention, but it will be understood that the two illustrated jaws are adapted when closed against the tube 15 of web material positioned therebetween to flatten the tube into two superimposed layers, to form two end seals in the material closly spaced from one another along the length of the tube and to cut the web material between the two end seals to separate the downstream package from the next following one.

Figure 4:
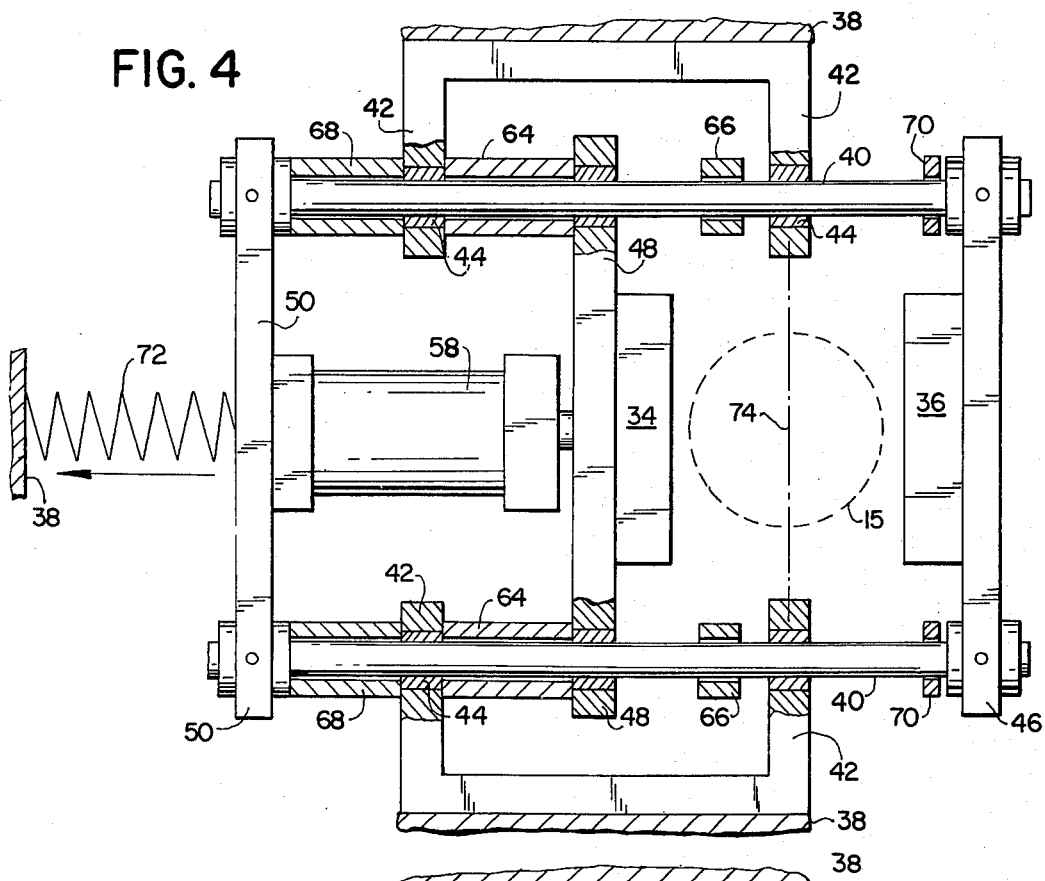
FIG. 4 is a schematic plan view of the end sealing mechanism of the machine of FIG. 1 with this view showing the mechanism with the jaws in their fully opened condition.

The two jaws 34 and 36 are supported for linear sliding movement relative to the machine base or frame 38 for movement between an open condition, as shown in FIGS. 2 and 4, and a closed condition, as shown in FIG. 6. The particular supporting mechanism includes tow rods 40, 40 arranged parallel to one another in a horizontal plane perpendicular to the vertical path of movement of the web tube 15. Each rod 40 is slidably supported for sliding movement along its longitudinal axis and relative to the machine base 38 by two bearing mounts 42, 42. The two mounts are spaced from one another along the length of their rod and each carries a bushing type slide bearing 44.

Extending between the two rods 40, 40 are three crosspieces 46, 48 and 50. The first crosspiece 46 is apertured to receive the rods and each rod is fixed to it both by a transverse pin 52 passing through the crosspiece and the rod and by two collars 54, 54 fixed by set screws or the like to the rods. Likewise, the third crosspiece 50 is apertured to receive the two rods and each rod is fixed to it by another pin 52 and two collars 54, 54. The two crosspieces 46 and 50 are located at opposite ends of the rods with the two bearing mounts 42, 42 of each rod being located therebetween. The second crosspiece 48 on the other hand, is located on each rod between the associated pair of bearing mounts 42, 42. It is apertured to receive the two rods 40, 40 which pass therethrough, and it is slidable relative to the rods, the cross-piece 48 for each rod having a bushing type bearing element 56 for slidably engaging the rod.

The first crosspiece 46 carries the jaw 36 and the second crosspiece 48 carries the cooperating jaw 34. Movement of the two jaws between their opened and closed conditions is effected by a fluid actuator in the form of a double acting air cylinder 58 connected between the third crosspiece 50 and the second crosspiece 48. As illustrated, the cylinder 58 has its base end fixed to the crosspeice 50 and its rod end connected to the crosspiece 48 so as to be operable to either push apart or pull together the two crosspieces 48 and 50.

As shown in FIGS. 2 and 3, a limit switch 60 is carried by the crosspiece 48 and a cooperating adjustable stop 62 is carried by the crosspiece 46. When the two jaws 34, 36 reach their closed condition, the switch 60 is tripped by the stop 62 and the tripping may be used as a signal to initiate electrical heating or other energization of one or the other or both of the jaws as part of the heat sealing procedure.

Considering the construction of the sealing mechanism as so far described, it will be noted that the two crosspieces 46 and 50, by virtue of being fixed to the rods 40, 40, are constrained to move in unison with one another and with the rods. Also, the cylinder 58 is not fixed directly to the base 38 of the machine at either of its ends. Therefore, during movement of the jaws between their opened and closed condition, the two ends of the cylinder 58 do not necessarily follow any fixed schedule of displacement relative to the base. Instead, the cylinder is free to float relative to the base until the jaws reach their fully opened or their fully closed condition.

A set of four stop means is included in the sealing mechanism of FIGS. 2 to 6 for cooperation with the cylinder 58 in the moving of the jaws between their opened and closed conditions. Two of these stop means act to limit movement of the jaw 34 in both directions along an axis parallel to the rods 40, 40 and the other two stop means similarly limit movement of the jaw 36 in both directions along the same axis.

With reference to FIG. 2, and considering first the two stop means for limiting movement of the jaw 34, the first of these stop means consists, for each rod 40, of a tubular part 64 received on the rod between the crosspiece 48 and the left-hand bearing mount 42. This tubular part limits movement of the jaw 34 in the opening direction and when the two jaws are in their fully open condition, as shown in FIG. 2, the part 64 is compressed between the crosspiece 48 and the left-hand bearing mount 42. The other stop means associated with the jaw 34 consists, for each rod 40, of a tubular part 66 received on the rod between the crosspiece 48 and the right-hand bearing mount 42.

Similarly, as viewed in FIG. 2, the two stop means associated with the jaw 36 consists, for each rod 40, of a tubular part 68 received on the rod between the crosspiece 50 and the left-hand bearing mount 42 and another tubular part 70 received on the rod between the crosspiece 46 and the right-hand bearing mount 42. The tubular part 68 on each rod limits movement of the jaw 36 in the opening direction, or to the right in FIG. 2, and the tubular part 70 on each rod limits movement of the jaw 36 in the closing direction, or to the left in FIG. 2.

Figure 5:
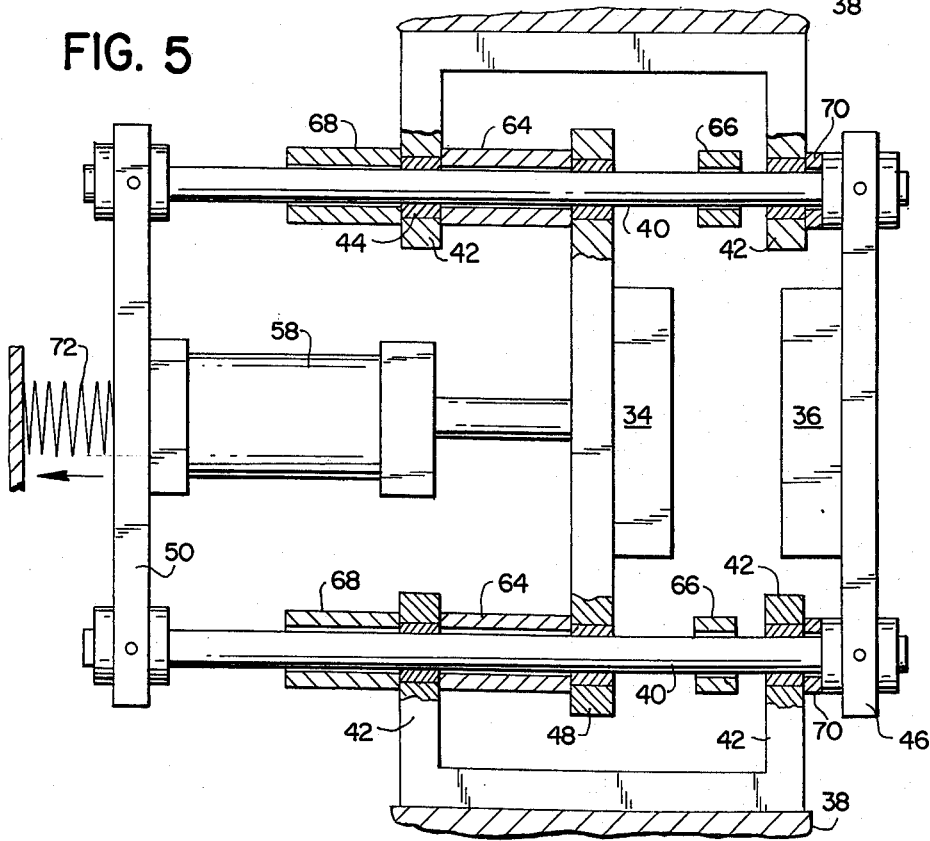
FIG. 5 is a view similar to FIG. 4 but with the jaws intermediate their fully opened and fully closed condition.

For a description of the operation of the jaw moving portion of the sealing mechanism, reference may be had to FIGS. 4, 5 and 6. FIG. 4 shows the two jaws in their fully open condition. In this state, the air cylinder 58 is energized to retract its rod and to draw the two crosspieces 48 and 50 toward one another. The stops 64, 64, 68 and 68 are of such lengths that they become effective to limit further movement of the jaws before the cylinder 58 reaches the corresponding limit of its stroke. Therefore, the jaw 34 is held in the position shown relative to the base 38 by the tubular stops 64, 64 which are simultaneously engaged by and compressed between the crosspiece 48 and the associated bearing mounts 42, 42, and the other jaw 36 is held in its illustrated position relative to the base 38 by simultaneous engagement of the crosspiece 50 and the associated bearing mounts with the two tubular stops 68, 68.

To move the two jaws from the open condition of FIG. 4 to a closed condition, the air cylinder 58 is energized to extend its rod. As the parts start to move from the open condition, either one or both of the two crosspieces 48, 50 may move in advance of the other or both may start moving simultaneously, depending on the amount of friction between the various parts and on other factors. If desired, a spring or set of springs may be used to bias one or the other of the jaws relative to the base so as to move in advance of the other. For example, in FIGS. 4, 5 and 6, a tension spring 72 is shown connected between the crosspiece 50 and the base 38 to bias the crosspiece 50 in the direction indicated by the arrow. In this case, due to the extra bias added by the spring 72, when the parts start to move from the fully open condition of FIG. 4, the crosspiece 50 will move in advance of the cross-piece 48.

Assuming that the crosspiece 50 does move prior to movement of the crosspiece 48, the crosspiece 50 moves, and with it the rods 40, 40, the crosspiece 46 and jaw 36, until the stops 70, 70 are engaged to prevent further closing movement of the jaw 36. Such condition is shown in FIG. 5.

After the FIG. 5 condition is reached, further extension of the rod of the cylinder 58 will cause the crosspiece 48 and jaw 34 to move toward the jaw 36, and such movement continues until the two jaws 36 and 34 encounter one another with the web material clamped therbetween. If either one of the two jaws 34 and 36 were not present, the crosspiece 48 would move a small distance further towards the crosspiece 46 until such movement was stopped by the stop 66, 66. That is, the lengths of the stops are such that regardless of how the jaws move toward one another during the closing phase, the stops 66, 66, 70 and 70 cause the two jaws to meet one another at a point close to the center line 74 of the path of movement of the tube 15, but they will not prevent the two jaws from pressing against one another to exert the full force of the cylinder 58 between them and the web material clamped therebetween.

FIG. 6 shows the parts in the fully closed condition of the jaws. With the jaws in this condition, the lengths of the tubes 66 and 70 on each rod 40 are such that in a typical case about 1/16 inch of axial play or looseness of the rod 40 relative to the base 38 exists. That is, when the jaws are closed, the rods, the three crosspieces, the air cylinder and the jaws are capable of being moved as a unit about 1/16 inch back and forth relative to the machine base.

The opening of the jaws from their fully closed to their fully opened condition is the reverse of that shown in FIGS. 4, 5 and 6, and again, either jaw may move in advance of the other or both may move simultaneously unless a spring or other biasing means is used to give preference of movement to one of the jaws.

The various stops 64, 66, 68 and 70 used in the illustrated mechanism may be axially fixed to either the rods or to the machine base 38 as by attachment to the associated bearing mounts 42, 42. Preferably, however, and as shown, they are loosely received on the rods and when not engaged are free to slide relative to both the rods and the base. They may be made of various different materials such as natural or artificial rubber, plastic or metal. If made principally of steel or other relatively non-resilient material, they may include a layer of rubber or other resilient material at either end to act as a bumper or cushion to soften impacts.

We claim:

1. A sealing mechanism for use in a machine for making packages from web material moved in a given path past said mechanism, said mechanism comprising: a base, first and second sealing jaws, means supporting both of said sealing jaws for movement independently of one another relative to said base along a given axis perpendicular to said path of movement of said web material, an actuator operably connected between said two sealing jaws, said actuator having one mode of energization wherein it urges said two jaws toward one another along said given axis to effect a relative closing movement of said jaws and having a second mode of energization wherein it urges said two jaws away from one another to effect a relative opening movement of said jaws, a first stop means for limiting movement of said first sealing jaw relative to said base in the direction away from said second sealing jaw, a second stop means for limiting movement of said first sealing jaw relative to said base in the direction toward said second sealing jaw, third stop means for limitimg movement of said second sealing jaw relative to said base in the direction away from said first sealing jaw, and fourth stop means for limiting movement of said second sealing jaw relative to said base in the direction toward said first sealing jaw.

2. A sealing mechanism as defined in claim 1 for use in a machine for making packages from web material and further characterized by said second and fourth stop means being so arranged that when said jaws are urged toward one another by said actuator they will encounter one another to prevent further relative movement therebetween before both of said jaws are prevented from moving any farther relative to said base by said second and fourth stop means.

3. A sealing mechanism as defined in claim 1 for use in a machine for making packages from web material and further characterized by said first and third stop means being so arranged that when said jaws are urged away from one another by said actuator said first and third stop means will prevent further movement of both of said jaws relative to said base before said actuator reaches the end, in the jaw opening direction, of its possible range of movement whereby upon energization of said actuator in said second mode said jaws are driven to a fully open condition relative to one another wherein each is held by said actuator in a definitely fixed position relative to said base as determined by said first and third stop means, respectively.

4. A sealing mechanism as defined in claim 1 for use in a machine for making packages from web material and further characterized by said actuator being a double acting fluid motor.

5. A sealing mechanism as defined in claim 1 for use in a machine for making packages from web material and further characterized by said means supporting both of said sealing jaws for movement independently of one another relative to said base including two spaced rods arranged parallel to one another and to said given axis in a common plane perpendicular to said path of movement of said web material, means supporting each of said tow rods for sliding movement relative to said base along its longitudinal axis, a first crosspiece extending transversely between and fixed to each of said two rods, a second crosspiece extending between and slidably supported by each of said rods, and a third crosspiece extending between and fixed to each of said rods, said second crosspiece being located on said rods between said first and second crosspieces, said first and second sealing jaws being mounted respectively on said first and second crosspieces, and said actuator being operably positioned between said second and third crosspieces, said actuator in said one mode of energization being operable to push apart said second and third crosspieces and in said second mode of energization being operable to pull together said second and third crosspieces.

6. A sealing mechanism as defined in claim 5 for use in a machine for making packages from web material and further characterized by said actuator being a double acting fluid cylinder having a base end fixed to one of said second and third crosspieces and a rod end fixed to the other of said second and third crosspieces.

7. A sealing mechanism as defined in claim 5 for use in a machine for making packages from web material and further characterized by said means for supporting each of said rods for sliding movement relative to said base comprising two bearing mounts fixed relative to said base and spaced from one another longitudinally of their associated rod, each of said bearing mounts having a bearing for slidably receiving its associated rod, said two bearing mounts for each rod being located between said first and third crosspieces and on eadh rod said second crosspiece being located between said two bearing mounts.

8. A sealing mechanism as defined in claim 7 for use in a machine for making packages from web material and further characterized by one of said bearing mounts for each of said rods being located on said rod nearer to said third crosspiece than is the other of said bearing mounts, said first stop mens including a tubular part received on each of said rods between said third crosspiece and said one bearing mount, said second stop means including a tubular part received on each of said rods between said first crosspiece and said other bearing mount, said third stop means including a tubular part received on each of said rods between said one bearing mount and said second crosspiece, and said fourth stop means including a tubular part received on each of said rods between said other bearing mount on said second crosspiece.

* * * * *